United States Patent [19]

Friese

[11] 3,931,055
[45] Jan. 6, 1976

[54] ELECTRICALLY CONDUCTING CERAMIC TO METAL SEAL, PARTICULARLY FOR SPARKPLUGS AND METHOD OF ITS MANUFACTURE

[75] Inventor: Karl-Hermann Friese, Leonberg, Germany

[73] Assignee: Robert Bosch G.m.b.H., Stuttgart, Germany

[22] Filed: Aug. 29, 1973

[21] Appl. No.: 392,493

[30] Foreign Application Priority Data
Sept. 15, 1972 Germany............................ 2245403

[52] U.S. Cl. ................ 252/503; 252/504; 252/506; 252/507; 403/29; 427/214
[51] Int. Cl.² .......................................... H01B 1/04
[58] Field of Search ........... 252/503, 504, 506, 507, 252/509, 510, 511

[56] References Cited
UNITED STATES PATENTS

| | | |
|---|---|---|
| 3,226,342 | 12/1965 | Kesten ............................... 252/503 |
| 3,538,021 | 11/1970 | Achey ................................ 252/506 |
| 3,567,658 | 3/1971 | Webb et al. ........................ 252/506 |

*Primary Examiner*—Richard A. Farley
*Assistant Examiner*—T. M. Blum
*Attorney, Agent, or Firm*—William R. Woodward

[57] ABSTRACT

Glass powder is wetted with an aqueous solution or emulsion of an organic binder and mixed with carbon black in the form of soot or lampblack. The resulting material is packed between the parts of the central electrode of a sparkplug and fired at a temperature sufficient to fuse the glass to produce a gas-tight seal with electrically conducting properties. Up to 5% of metal powders may be included in the material if it is desired to prevent the resistance from rising during service. Oxides or carbides and certain other metal powders may be added to bring the thermal expansion coefficient to a desired average value.

17 Claims, 3 Drawing Figures

ELECTRICALLY CONDUCTING CERAMIC TO METAL SEAL, PARTICULARLY FOR SPARKPLUGS AND METHOD OF ITS MANUFACTURE

This invention relates to an electrically conducting sealing material for joints between ceramic and metal parts, particularly in sparkplugs, and more specifically relates to sealing materials made principally from powdered glass and an electrically conducting component likewise in the form of a powder. The invention also involves a method for the production of such sealing materials.

Sparkplugs, as is well known, are produced in very large quantities. In consequence it is important to introduce every possible economy in the manufacture of such articles. This applies also for the sealing material with which the electrodes are set in a gas tight fashion in the insulating body of the sparkplug. This sealing material, which consists essentially of a vitrified material, must at the same time as providing a seal also have good electrical conductivity, because as sparkplugs are commonly built, the lower and upper parts of the central electrode must be electrically connected together by the sealing material.

Metals of good electrical conductivity, especially copper, are predominantly used today as the conductive component of the seal. Copper is relatively expensive, however, so that efforts have been made to replace it by a cheaper metal. That effort has in fact been successful, for in the meanwhile it was found that copper can be fully replaced by a mixture of iron and graphite, a substitution that brought about an appreciable cost reduction in sparkplug production. The iron part of these sparkplugs is still the principal cost factor of the seal, because a relatively high proportion by weight of iron must be used, as the result of the relatively high specific gravity of iron.

Experiments have been made to make similar sealing materials with graphite powder as the only electrically conducting component, but these experiments have failed, because a relatively high proportion by volume of graphite is necessary to produce electrically stable melts and thereby to obtain an adequate electrical conductivity in the finished seal. Such high graphite proportions are difficult to control, even in the known production processes for articles pressed out of graphite-glass mixtures, which are quite simple and therefore also economic. This is because graphite is poorly wetted by aqueous solutions of organic binders. Finally, high volume proportions of graphite limit the gas tightness itself when used for a sealing material.

It is an object of the present invention to provide a sealing material containing a conductive material that is cheaper than those previously used and is suitable for prolonged operation in such articles as sparkplugs, in that the resistance will not substantially increase and that the tightness of the seal and other important properties will not be damaged by temperature variations. It is a further object of this invention to provide such a sealing material in a form that can be made by the utilization of existing production procedures.

SUBJECT MATTER OF THE PRESENT INVENTION

Briefly, finely divided carbon in the form known as soot or lampblack is used as the electrically conducting component and mixed with a larger quantity of glass granules and an aqueous solution of emulsion of an organic binder. When this material is packed into a seal and heated to finish the seal, a cylindrical body of about 4.5mm diameter and 4.5mm long has an electrical resistance between 0.5 and 50 Ohms.

The use of carbon black in so-called resistance inserts is in itself known. By resistance inserts is understood bodies providing a resistance of at least 1000 Ohms and higher. In consequence such resistance bodies contain a carbon black content of at most 4% by weight, which gives rise to no particular difficulty in preparation. In contrast, the sealing material according to the present invention, the principal conducting component of which is carbon black, contains carbon black in substantially greater proportions by volume, to wit from 10 to 40% by volume with reference to the sealing material as finally prepared. This higher carbon black content contributes to other physical properties, especially the thermal expansion coefficient. The thermal expansion coefficient of the insulator material and of the sealing compound must be made at least approximately equal in order for the seal to be durable under thermal variations.

In the sealing material of this invention there is used along with the carbon black a glass powder that has a thermal expansion coefficient similar to or in some cases somewhat smaller than that of carnon black, which is $6 \cdot 10^{-6}/°C$. A somewhat smaller thermal expansion coefficient for the glass compared with that of carbon black has been found particularly favorable, a circumstance which can perhaps be traced to the fact that in this case the carbon patches compressed between melted glass are not broken up or only slightly split up upon cooling of the sealing material, so that no interruption of the conducting paths nor even an increase of the resistance across the seal occurs. In order to adjust the average thermal expansion coefficient (TEC) of the sealing material to that of the surrounding ceramic, materials with higher or lower TEC are mixed in according to whether a raising or lowering of the composite TEC is necessary. These additions are made within the basic requirement that in any event these materials should not chemically react, or should react only to a very small extent, with the glass or with the carbon black. Among such materials the following have been found particularly well suited for the purpose: oxides such as corundum, mullite, and zirconium dioxide; carbides such as silicon carbide or titanium carbide, and nitrides such as boron nitride, titanium nitride or zirconium nitride. Metal powder may also be added for this purpose even if it reacts in part to form a carbide, as in the case of iron. For sealing compounds to be fired in a ceramic material rich in clay, as for example sparkplug insulators with a TEC of 6.5 to 7.0 $\cdot 10^{-6}/°C$, graphite powder is particularly useful in an inert additive. Graphite is a relatively cheap raw material with a low specific gravity of 2.25g per cm$^3$. The TEC of graphite, which is $7.9 \cdot 10^{-6}/°C$, is higher than that of the sparkplug insulator, which means that the average TEC of the fired seal can be brought close to that of the insulator. A somewhat smaller value for the TEC of the seal is desirable, because upon cooling after firing, the seal is held under compressive forces in the central bore of the insulator. Care must be taken, however, that the TEC of the seal does not fall too low, because then the grasp on the metallic electrode will no longer be sufficient. Apart from the properties just discussed, graphite can absorb mechanical stresses in the cooled seal after firing without producing cracks, because of its layer structure and its resulting lubricating quality. Finally, the graphite also contributes to the formation of conductive paths, by virtue of its good electrical conductivity.

The graphite or the other above-named inert materials are added as required for the purposed above described in a quantity amounting to 0.5 to 15% by volume of the final mixture.

Under the prolonged stress of sparkplug service, for example 300 hours at 350°C with 3200 sparks per minute at a peak voltage of 15kV, sealing materials of the kind here described show a rise of the resistance value from about 2 Ohms to about 6 Ohms. This effect produces practically no impairment of the function of the sparkplug under normal conditions. This rise in the resistance can, however, be fully suppressed if there is provided in the sealing material 0.5 to 5.0% by volume of the powder of a low-melting metal, or else the powder of a metal that is capable of forming carbides at the firing temperature of the seal, which is between 750° and 950°C. Zinc or tin come most prominently into consideration for addition as a low-melting metal powder, whereas aluminum and iron are preferred as carbide forming metals. Aluminum has worked particularly well, because it has a low specific gravity and therefore is effective even in small proportions by weight, because in these mixtures what is important is not the proportion by weight but rather the proportion by volume.

There is evidence that the aluminum reacts partly or fully with the carbon black to form aluminum carbide, and that this aluminum carbide component produces the electrical stability of the fired seal. The aluminum powder must be a very fine grain powder, so that it can be distributed as uniformly as possible throughout the material by a mixing or milling process. Aluminum powder available under the designation Type A1 1401 from Alcoa has been found particularly suitable for these sealing materials.

The proportion of low-melting metal powder must not exceed particular values that are set by the fact that when present in larger amounts, the melted metal will be pressed out of the seal during firing, which in the case of sparkplug manufacture, for example, would mean that the melted metal would flow through, past the central electrode, into the recess at the lower end of the device.

If the aluminum content is kept sufficiently small, the sealing material of this invention has the advantage, as compared with conventional copper-containing seals, that silver electrodes can be heat-sealed in insulators with it, because no corrosive attack of aluminum on the silver electrode takes place.

Two production methods are preferred for the preparation of the sealing compounds of this invention:

1. Glass powder is wetted with an aqueous solution or emulsion of an organic binder such as dextrin, methyl cellulose or wax or a mixture of some or all of them, and then the remaining components are applied successively or simultaneously to the powdered glass, in which case the particle size of the powdered glass must be at least ten times that of the other powder.

2. All components of the sealing material are milled together and then are mixed with an aqueous solution or emulsion of an organic binder such as dextrin, methyl cellulose or wax or a mixture of some or all of them, to form a pasty mass, which is then granulated in a granulator to provide a material that can be poured for handling and can be packed into a seal.

The invention will now be described by way of example with reference to the accompanying drawings, wherein.

Figure 1:
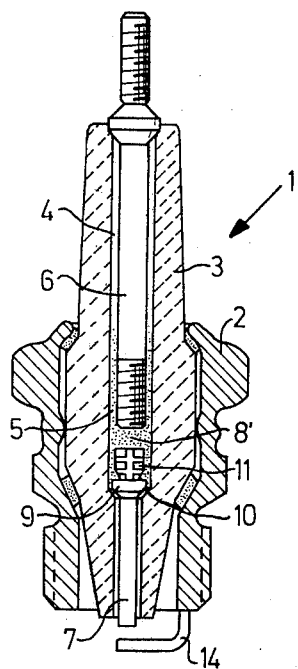
FIG. 1 is a longitudinal cross section of a sparkplug.

The sparkplug 1 shown in FIG. 1 consists of an insulator 3 held gas tight in a metal ferrule or housing 2. In the axial bore 4 of the insulator 3 is an upper central electrode 6 for the contact side of the device, provided with a threaded portion 5 at its lower end and also a lower central electrode 7 at the spark side of the device. In the central section of the insulator bore 4 is a vitrified insert 8' made of one of the compositions further described below, through which the electrode portions 5 and 7 are conductively connected together. The ground electrode of the sparkplug is indicated with the reference numeral 14.

The manufacture of the sparkplug 1 follows known procedures, which may briefly be described as follows: The lower electrode piece 7 is inserted from above into the bore 4 of the sparkplug insulator, until it is seated with its bevelled end portion 9 resting on an internal annular shoulder 10. The thoroughly mixed sealing material 8, for example that produced by the process identified as 1 above, having one of the compositions further set forth below, is then put into the insulator bore. As the result of the method of production above described (method 1), the sealing material consists (see FIG. 2) of glass particles 12 with a conductive surface layer 13 consisting essentially of carbon black and graphite, with an aspect such as shown schematically in FIG. 2.

While the material is still in the cold state, the central electrode 6 for the contact side of the device is introduced and pressed into the cold sealing material. The insulator assembly thus prepared is then heated in an oven to the necessary firing temperature. Immediately after it is removed from the oven, the upper central electrode piece 6 is pressed into the sealing material until the shoulder near its upper extremity hits against the top of the insulator. The insulator cools down under pressure until the temperature falls below the transformation temperature of the glass. A vitrified insert 8' surrounding in gas tight fashion both of the parts of the central electrode has now been formed. This vitrified insert has a characteristic structure shown in FIG. 3 in which the individual glass particles 12 have been fused by the firing into a continuous glass skeleton 12' which is interpenetrated by a coherent conductive structure 13' in the form of an irregular three-dimensional web formed out of the conductive powder grains 13 of FIG. 2.

For securing of the head 9 of the electrode 7 on the spark side of the plug firmly in the device, which is important because of the particularly high thermal stresses, the head 9 is provided with an extension 11 having mutually intersecting ribs. The transformation temperature of the glass, which has already been mentioned above, should lie clearly above the temperatures at which the firing of the seal takes place. If the transformation temperature should be lower than the temperature of use, the gas-tightness of the seal and the mechanical solidity of the two central electrodes pieces 6 and 7 are in danger.

It is therefore particularly desirable that the glass used in the sealing material should have a transformation temperature as high as possible. Its softening temperature, moreover, should be low and should extend over a broad temperature range, in order to meet the firing requirements as simply and economically as possible. It is, moreover, necessary to select the properties of the glass component of the sealing material, particularly its TEC, so that an average TEC results which approximates as closely as possible the TEC of the insulator material.

Another property of the glass plays an important part when sealing materials of this invention are used on a large scale: The obtaining of the desired particle size fraction in a pulverizing operation must proceed with a sufficiently high yield.

It has been found that alkali borosilicate glasses and lead borosilicate glasses most satisfactorily meet these required conditions. It is also possible to use lithium-calcium-borosilicate glasses or barium-calcium-borosilicate glasses, which is particularly to be recommended if resistor inserts for radio interference prevention are to be fired in the sparkplug at the same time as the seals, because in this case both heat fusions can be carried out with the same glass. This can have particular advantages from both the technical and economic standpoint, because then preparation facilities for only one type of glass need be provided.

In the following table examples of glasses are specified which fill the requirements above mentioned, and for each example there is given the composition, the thermal expansion coefficient, the transformation temperature and the usable fusion temperature:

Of the glass compositions set forth in Table 1, the one with the Ser. No. 6 has the most favorable processing and application properties. The temperature necessary for fusion, 820°C, lies relatively low, while the transformation temperature, 545°C, is the highest in the table, except for the one with the Ser. No. 7. Since the properties of fused seals made with glass No. 6 at temperatures about 100°C lower are fully adequate, the glass composition No. 7 is uneconomic for sparkplugs.

The electrically conducting component of the sealing composition above described is, as already mentioned, finally carbon black powder, such as lampblack, channel black, or xome other variety of industrially produced soot. The thermally deposited carbon powder specifically known as "thermal black" works particularly well. That is a relatively coarse particle soot with an average primary grain size of 0.1 to 0.5 $\mu$m, obtained by thermal decomposition of hydrocarbons. As compared with pelletized carbon black used in the tire industry, even coarse soot is finely divided. Particularly good results for the purposes of the present invention are obtained with thermally deposited carbon black having a specific surface area of approximately 5 to 15m$^2$/g, for example the variety known as Sterling MT available from Cabot Corporation, which has a specific surface of about 7m$^2$/g. Carbon black in the form of soot has a very low specific gravity (1.8g/cm$^3$), from which it follows that only small proportions by weight of carbon black need to be included in the material. Such carbon blacks are industrially produced on a large scale and are therefore very cheap.

On account of the higher specific resistance of carbon black in comparison to the metal powders previously used for ceramic to metal seals, the fused seals produced in accordance with the invention have basically higher resistance values, which may lie between about 0.5 and 50 Ohms, whereas with the metal pow- Table I

| Ser. No. | Glass Composition (% by weight) | | | | | | | | TEC 10$^6$ | $t_g$ | $t_F$ |
|---|---|---|---|---|---|---|---|---|---|---|---|
| | SiO$_2$ | B$_2$O$_3$ | Na$_2$O | Li$_2$O | CaO | BaO | PbO | Al$_2$O$_3$ | | | |
| 1 | 63,1 | 27,8 | 6,8 | — | — | — | — | 2,5 | 4,6 | 510 | 830 |
| 2 | 61,0 | 30,2 | 8,2 | — | — | — | — | 0,4 | 5,2 | 505 | 820 |
| 3 | 56,0 | 33,5 | 4,4 | 1,7 | 3,4 | — | — | 0,8 | 5,0 | 520 | 820 |
| 4 | 41,3 | 44,7 | 0,12 | 2,4 | 6,1 | — | 3,7 | 0,5 | 4,1 | 520 | 810 |
| 5 | 55,5 | 38,9 | — | 5,6 | — | — | — | 0,1 | 5,0 | 500 | 830 |
| 6 | 51,0 | 38,0 | 0,7 / 0,16 | 3,4 | 6,9 | — | 0,1 | 0,5 | 4,8 | 545 | 820 |
| 7 | 57,1 | 21,1 | +0,48 K$_2$O | — | 6,9 | 3,6 | 0,1 | 10,3 | 4,0 | 635 | 950 |
| 8 | 59,3 | 27,5 | 9,5 | — | — | — | — | 3,8 | 6,3 | 500 | 810 |

TEC: Thermal expansion coefficient in °C$^{-1}$
$t_g$: Transformation temperature in °C
$t_F$: Usable temperature of fusion (under the same heat sealing conditions) in °C.

The glasses with the serial numbers 1 through 7 are suitable for use as the sole glass component of the material. Mixtures of powders of different glasses can also be used to make the materials of this invention if a fused glass of the necessary properties is formed by the interaction or combination of these glass varieties with each other. In such case, however, no voids or cracks should be produced, for example by escape of gases or brought about by thermal overstrains. It is also possible to include types of glass with deformability qualities, as for example alkali borosilicate glasses with a TEC equal to or greater than 6 · 10$^{-6}$/°C. There may be mentioned here, as an example, a mixture of equal proportions by weight of the glasses listed in Table I with the Ser. No.'s. 6 and 8, which mixture has the desired properties.

ders above named, if more than 10% by volume thereof is provided, resistances from 1 to 200 milliohms are obtainable. In the application of the sealing materials of the invention to sparkplugs, however, the higher resistance values of the seals containing carbon black can be accepted without consequence. Resistance values varying in the range above set forth have no significance at all if the sealing material of this invention is provided as a contact capsule for each and of the central electrode, supplementing a fused resistor insert. In this case the same glass can be used both for the contact capsules and for the resistance insert between them, as already mentioned above, to obtain the result that the resistance insert suffers no substantial fall of the resistance value at higher spark voltages, so that the desired interference elimination function is likewise not impaired. With the use of different glasses, voids and cracks could arise in the transition zones, which could produce many undesirable effects.

Figures 2, 3:
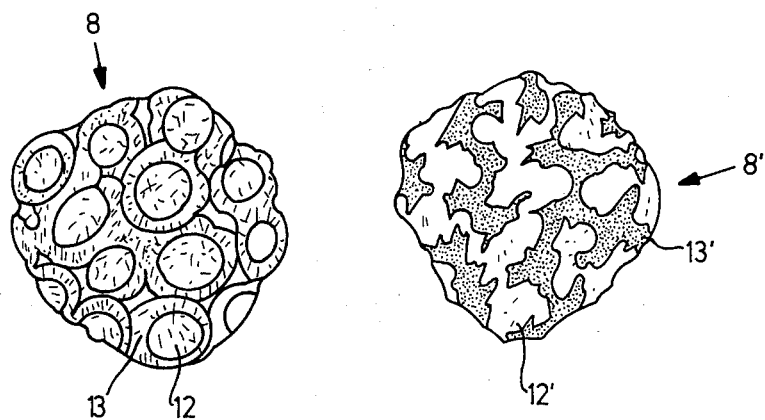
FIG. 2 is a highly magnified veiw of an agglomerate of the powder mixture resulting from the process designated as 1 above, prior to firing.
FIG. 3 is a likewise magnified view of a fragment of the seal after firing a sealing material made by the process designated as 1 above.

Several specific examples of compositions of the sealing material 8 of FIG. 2 according to the invention are set forth below. The manufacture of the sealing materials of these examples was carried out in each case in accordance with the process described as 1 above. The composition of the glass used is identified by a number referring to Table I above. All percentage compositions are by weight.

EXAMPLE I:

| | |
|---|---|
| Glass 6; 0.06 to 0.3 mm particles | 61.0% |
| Carbon black(7 m²/g) | 14.0% |
| Graphite | 11.8% |
| Aluminum powder (Type Al 1401) | 0.9% |
| Dextrin, 35% water solution | 1.3% |
| Methyl-Cellulose, 3% water solution | 11.0% |

Resistance Value Obtained: 1 – 3 Ohms.

EXAMPLE II:

| | |
|---|---|
| Glass 4; 0.06 to 0.3 mm particles | 61.0% |
| Carbon black | 14.8% |
| Graphite | 11.8% |
| Binders as in Example I | |

Resistance Value Obtained: 2 – 4 Ohms.

EXAMPLE III:

| | |
|---|---|
| Glass 6; 0.06 to 0.3 mm particles | 63.1% |
| Carbon black | 23.5% |
| Aluminum powder | 1.1% |
| Binders as in Example I | |

Resistance Value Obtained: 5 – 7 Ohms.

EXAMPLE IV:

Composition as in Example I, except that Glass 2 is used
Resistance Value Obtained: 1.5 – 3 Ohms.

EXAMPLE V:

Composition as in Example I, except that the Glass is a mixture of two varieties of glass:

| | |
|---|---|
| Glass 6; 0.06 to 0.3 mm particles | 30.5% |
| Glass 8; 0.06 to 0.3 mm particles | 30.5% |

Resistance Value Obtained: 1 – 2 Ohms.

EXAMPLE VI:

| | |
|---|---|
| Glass 6; 0.06 to 0.3 mm particles | 60.6% |
| Carbon black | 11.7% |
| Graphite | 11.7% |
| Aluminum powder | 3.6% |
| Binders as in Example I | |

Resistance Value Obtained: 9 – 18 Ohms.

EXAMPLE VII:

| | |
|---|---|
| Glass 6; 0.06 to 0.3 mm | 50.6% |
| Carbon black | 11.7% |
| Zirconium dioxide | 24.6% |
| Binders as in Example I | |

Resistance Value Obtained: 15 – 25 Ohms.

As may be observed from the above examples, the resistance values that can be obtained lie mostly below 10 Ohms, while in no case is the value of 50 Ohms exceeded.

Although the invention has been described with respect to particular examples and embodiments, it is to be understood that variations and modifications may be made within the inventive concept.

I claim:

1. An electrically conducting material for ceramic to metal seals, particularly suitable for spark plugs, said material being composed of glass granules and of a conducting powder composed principally of carbon black in its powder form and containing no substantial amount of a metal other than not more than 5% by volume of a powdered metal capable of forming a carbide between 750° and 950°C and other than not more than 5% by volume of a metal melting at a temperature not higher than the melting point of zinc (419°C), said material being mixed together and sintered in place and exhibiting, with reference to a cylindrical body of about 4.5 mm diameter and about 4.5 mm length, a resistance between 0.5 and 50 Ohms.

2. A ceramic to metal seal material as defined in claim 1 in which the conducting material is thermal black.

3. A ceramic to metal seal material as defined in claim 2 in which said thermal black has a specific surface of 5 to 15 square meters per gram.

4. A ceramic to metal seal material as defined in claim 3 in which the material as prepared contains carbon black in a proportion of between 10 and 40% by volume.

5. A ceramic to metal seal material as defined in claim 4 in which the glass component has a thermal expansion coefficient equal to or smaller than $6 \times 10^{-6}/°C$.

6. A ceramic to metal seal material as defined in claim 5 in which the glass component is a borosilicate glass with or without a minor content of oxides of one or more of the metals in the group consisting of lithium, calcium and barium.

7. A ceramic to metal seal material as defined in claim 6 in which there is also present an additional material that is inert with respect to glass and to carbon black and cooperates with the glass and the carbon black to provide an average thermal expansion coefficient for the material, which approximates that of the surrounding ceramic.

8. A ceramic to metal seal material as defined in claim 7 in which said inert component is a material selected from the group consisting of corundum, mullite, zirconium dioxide, silicon carbide, titanium carbide, boron nitride, titanium nitride and zirconium nitride.

9. A ceramic to metal seal material as defined in claim 7 suited for use with high alumina ceramic materials, which material contains graphite as part of its inert component.

10. A ceramic to metal seal material as defined in claim 8 in which the inert component is present in a proportion between 0.5 and 15% by volume.

11. A ceramic to metal seal material as defined in claim 1 in which, in order to prevent a rise of resistance under prolonged stress in spark service, there is included as a component the powder of a metal having a melting point not higher than the melting point of zinc, in a proportion between 0.5 and 5.0% by volume.

12. A ceramic to metal seal material as defined in claim 1 in which there is provided for prevention of rise of resistance by prolonged stress in spark service, a component consisting of the powder of a metal capable of forming a carbide between 750° and 950°C, said metal powder being incorporated in the material in a proportion between 0.5 and 5.0% by volume.

13. A process for preparing a sealing material for ceramic to metal seals comprising the steps of:
wetting glass powder with a water solution or emulsion of an organic binder selected from the group consisting of dextrin, methyl cellulose, wax and combinations of two or more of them, and then
coating the particles of said glass powder over a substantial part of their respective surfaces with smaller particles of carbon black no greater than one-tenth the size of the particles of the glass powder by mixing the wetted glass particles with a finely divided material of which at least 85% consists of the aforesaid carbon black particles and the remainder consists of particles of non-metallic inert material selected from the group consisting of corundum, mullite, zirconium dioxide, silicon carbide, titanium carbide, boron nitride, titanium nitride and zirconium nitride, the particles of said inert material being of a size likewise no greater than one-tenth the size of the particles of the glass powder.

14. A process as defined in claim 13 in which the finely divided material with which the glass particles are mixed constitutes not more than 40% of the mixture by volume and contains between 0.5 and 15% by volume of said inert nonmetallic material.

15. A process for preparing a sealing material for ceramic to metal seals comprising the steps of:
wetting glass powder with a water solution or emulsion of an organic binder selected from the group consisting of dextrin, methyl cellulose, wax and combinations of two or more of them, and then
coating the particles of said glass powder over a substantial part of their respective surfaces with smaller particles of carbon black no greater than one-tenth the size of the particles of the glass powder by mixing the wetted glass particles with a finely divided material constituting between 10 and 40% by volume of the complete mixture, said finely divided material consisting of at least 85% by volume of the said carbon black particles, between 0.5 and 5% by volume of the mixture of a component for preventing increase of resistance in sparkplug service, selected from the group consisting of powdered zinc, powdered tin, powdered aluminum and powdered iron, and the remainder consisting of particles of nonmetallic inert material selected from the group consisting of graphite, corundum, mullite, zirconium dioxide, silicon carbide, titanium carbide, boron nitride, titanium nitride and zirconium nitride, all the particles of said finely divided material being of a size no greater than one-tenth the size of the particles of the glass powder.

16. A ceramic to metal seal as defined in claim 11 in which said metal having a melting point not higher than the melting point of zinc is a metal selected from the group consisting of zinc and tin.

17. A ceramic to metal seal as defined in claim 12 in which said metal capable of forming a carbide is a metal selected from the group consisting of aluminum and iron.

* * * * *